United States Patent [19]

Bullock et al.

[11] Patent Number: 5,045,170
[45] Date of Patent: Sep. 3, 1991

[54] ELECTRODIES CONTAINING A CONDUCTIVE METAL OXIDE

[75] Inventors: Norma K. Bullock, Pewaukee; Wen-Hong Kao, Brown Deer, both of Wis.

[73] Assignee: Globe-Union, Inc., Milwaukee, Wis.

[21] Appl. No.: 345,993

[22] Filed: May 2, 1989

[51] Int. Cl.$^5$ .................. C25B 11/00; H01M 4/14
[52] U.S. Cl. .................... 204/280; 204/96; 204/290 F; 252/187.1; 429/210; 429/225; 429/227; 429/228
[58] Field of Search ............ 429/232, 245, 227, 225, 429/210, 228, 238; 204/290 F, 96, 280; 252/182.1

[56] References Cited

U.S. PATENT DOCUMENTS

| | | |
|---|---|---|
| 1,572,586 | 2/1926 | Weir . |
| 2,159,226 | 5/1939 | Reid . |
| 2,182,479 | 12/1939 | Johnstone . |
| 3,169,890 | 2/1965 | Voss et al. . |
| 3,194,685 | 7/1965 | Mallory . |
| 3,374,185 | 3/1968 | Nitta et al. . |
| 3,449,166 | 6/1969 | Jache . |
| 3,765,943 | 10/1973 | Biagetti . |
| 3,795,543 | 3/1974 | Poe . |
| 3,861,961 | 1/1975 | Kudo et al. . |
| 3,898,100 | 8/1975 | Louzos ............................. 429/104 |
| 3,901,730 | 8/1975 | Louzos . |
| 3,932,315 | 1/1976 | Sleight ............................. 252/518 |
| 3,942,433 | 3/1976 | Wohlfarter . |
| 3,974,026 | 8/1976 | Emson et al. . |
| 4,015,230 | 3/1977 | Nitta et al. . |
| 4,019,431 | 4/1977 | Bastgen . |
| 4,032,417 | 6/1977 | Peterson . |
| 4,086,157 | 4/1978 | Koziol et al. ................... 204/290 F |
| 4,098,967 | 7/1978 | Biddick et al. . |
| 4,111,765 | 9/1978 | Nora et al. ..................... 204/290 F |
| 4,297,421 | 10/1981 | Turillon et al. ................ 429/225 |
| 4,316,782 | 2/1982 | Foller et al. . |
| 4,352,899 | 10/1982 | Tada et al. . |
| 4,388,210 | 6/1983 | Parker . |
| 4,422,917 | 12/1983 | Hayfield . |
| 4,470,898 | 9/1984 | Penneck et al. . |
| 4,475,453 | 10/1984 | Davis . |
| 4,501,669 | 2/1985 | Hakansson et al. . |
| 4,541,989 | 9/1985 | Foller . |
| 4,547,443 | 10/1985 | Rowlette et al. . |
| 4,562,124 | 12/1985 | Ruka ................................. 429/30 |
| 4,697,511 | 10/1987 | Davis et al. . |
| 4,705,602 | 11/1987 | Dahl . |
| 4,761,711 | 8/1988 | Hiremeth et al. . |

FOREIGN PATENT DOCUMENTS 2128667 10/1972 France .
63-136507 6/1988 Japan .

OTHER PUBLICATIONS

"The Anodic Evolution of Ozone", J. Electrochem. Soc., Mar. 1982, vol. 129, No. 3, pp. 506–515, Foller & Tobias.
The Mechanism of the Disintegration of Lead Dixoide Anodes Under Conditions of Ozone Evolution in Strong Acid Electrolytes, Foller & Tobias, J. Electrochem. Soc., Mar. 1982, pp. 567–570.
Chemical Abstracts, vol. 79, Aug. 27, 1973, No. 8 pp. 277–278.
The Electrochemical Generation of High Concentration Ozone for Small-Scale Applications, Foller & Goodwin, Ozone: Science and Engineering, vol. 6, pp. 29–36, 1984.

Primary Examiner—Donald L. Walton
Attorney, Agent, or Firm—Foley & Lardner

[57] ABSTRACT

An electrode suitable for use as a lead-acid battery plate contains an inorganic metal oxide additive which enhances the formation of the plate. The additive is electrically conductive, stable in aqueous solutions of sulfuric acid, but does not participate in the electrode reaction. Suitable metal oxides include barium metaplumbate and other ceramic perovskite materials having similar properties. The conductive ceramic may also be used in electrodes for bipolar lead-acid batteries and in an electrode, particularly an anode (positive electrode), used in electrolytic processes.

57 Claims, 3 Drawing Sheets

ELECTRODIES CONTAINING A CONDUCTIVE METAL OXIDE

TECHNICAL FIELD

This invention relates to an electrode of the type used in an acid electrolyte, more particularly to an electrode for use in a sulfuric acid electrolyte as a lead-acid battery plate or for electrosynthesis.

BACKGROUND OF THE INVENTION

Conventional lead acid battery plates include a positive electrode ($PbO_2$ plate) and a negative electrode (Pb plate) immersed in a sulfuric acid electrolyte and having a separator interposed therebetween. As a means of improving the ease of manufacture of such batteries, a variety of conductive additives have been proposed for incorporation into the plates. Lead dioxide has been proposed as an additive for paste mixtures containing tetrabasic lead sulfate, as described in Reich, U.S. Pat. No. 4,415,410, issued Nov. 15, 1983. Lead dioxide has also been formed in battery pastes by a reaction between lead monoxide and a persulfate salt (Reid, U.S. Pat. No. 2,159,226, issued May 23, 1939) or with ozone (Parker, U.S. Pat. No. 4,388,210, issued June 14, 1983, and Mahato et al., U.S. Pat. No. 4,656,706, issued Apr. 14, 1987). Lead dioxide enhances positive plate formation but provides no substantial advantages in the resulting battery because it participates in the positive plate reaction. During charging of the battery, lead sulfate is converted into lead dioxide, and the reverse reaction occurs during discharge.

Carbon has been used as a lead-acid paste additive, and has been used in combination with plastic materials in electrodes for bipolar lead-acid batteries, as described in Biddick, U.S. Pat. No. 4,098,967, issued July 4, 1978. Carbon, however, is not stable as a positive electrode material because it tends to oxidize. Thus, bipolar electrodes utilizing carbon as the conductive filler are not generally satisfactory for long-term use.

Metal oxides including titanium and tin oxides have also been suggested as additives for lead-acid battery plates. See, for example, Rowlette et al., U.S. Pat. No. 4,547,443, issued Oct. 15, 1985, and Hayfield, U.S. Pat. No. 4,422,917, issued Dec. 27, 1983. These additives have proven somewhat useful but fail to completely meet the need for a conductive additive which is economical, enhances plate formation and also improves the properties of the resulting lead-acid battery.

The present invention involves the use of conductive ceramics which exist in a perovskite crystal structure. The term "perovskites" as used herein refers to a large class of inorganic oxides which crystallize in a structure related to that of the mineral perovskite, $CaTiO_3$. While the perovskite-type structure is ideally cubic, small distortions from cubic symmetry are common, as are superstructure variants in which a larger unit cell extended by a simple multiple in one or more dimensions is needed to account for some ordering of the cations among particular sites. Many oxides of perovskite-type structure are known to have minor departures in stoichiometry from the ideal formula $ABO_3$. Thus, slight oxygen deficiencies up to about 5% are quite common.

Conductive metal oxides have been used in a variety of applications, for example, in polymeric compositions for electrical components as described in Penneck et al., U.S. Pat. No. 4,470,898, issued Sept. 11, 1984, and in corrosion-resistant coatings as described in Tada U.S. Pat. No. 4,352,899, issued Oct. 5, 1982. Superconductors resulting from solid solutions of $BaPbO_3$ and $BaBiO_3$ are also known. See Sleight, U.S. Pat. No. 3,932,315, issued Jan. 16, 1976, and Inagaki Japanese Patent Pub. 63-112423 (1988), which discloses compounds of the formula $MPbO_3$, wherein M is Zn, Mn or Cd. Interest in such materials, however, has focused mainly on their superconductive properties.

Many patents describe the use of perovskite compounds such as barium metaplumbate ($BaPbO_3$) in electrical components such as semiconductors, capacitors, and resistors. See, for example, Nitta et al., U.S. Pat. No. 3,374,185, issued Mar. 19, 1968, Hiremuth, U.S. Pat. No. 4,761,711, issued Aug. 2, 1988, Japanese Patent Pub. 63-136507, and Chemical Abstracts 106:147845v, 109:65406a, 85:185653m, 79:46649c and 79:46650w. Louzos, U.S. Pat. Nos. 3,898,100, issued Aug. 5, 1975 and 3,901,730, issued Aug. 26, 1975, describe the use of a wide variety of inorganic oxygen compounds of the formula $X_aY_bO_c$, generically including $BaPbO_3$, for use in a cathode mix for solid electrolyte cells. Ruka U.S. Pat. No. 4,562,124 describes solid metal oxide solutions of perovskite-like structure for use in air electrodes for electrochemical cells. Otherwise, little attempt has been made to utilize perovskite compounds in battery electrodes.

Some types of perovskite materials have also been generally proposed for use as electrode coatings for electrodes used in electrolytic processes. See, for example, Peterson, U.S. Pat. No. 4,032,427, issued June 28, 1977, describing a family of oxide bronze compounds, and Kudo et al. U.S. Pat. No. 3,861,961, issued Jan. 21, 1975. However, many perovskites are not stable in sulfuric acid, and there remains a need for an electrode which is suitable for use in electrolytic processes conducted in sulfuric acid solutions, and which can be simply and inexpensively prepared.

The present invention further concerns electrodes for use in electrochemical processes. Many known electrolytic processes are conducted in a sulfuric acid environment, for example, processes for the synthesis of ozone, manganese dioxide, acetylene dicarboxylic acid, adiponitrile, tetramethyl lead, hexahydrocarbazole, α-methyldihydroindole, dihydrophthalic acid, and anthraquinone. The materials used to make electrodes for these processes have various drawbacks, such as expense and poor performance characteristics. For example, in the conventional synthesis of electrolytic manganese dioxide (EMD), the anode substrate used is either carbon, lead or titanium, with or without surface treatment. Each of these materials has limitations when used in such an anode. The quality of $MnO_2$ deposited on a carbon anode is usually not as good as that from a titanium anode. A lead anode is too soft, and lead impurities are detrimental to the performance of the manganese dioxide product. A titanium anode is sufficiently strong, but has problems with dissolution into sulfuric acid, passivation during deposition, and high cost. To overcome the passivation problem, sand blasting or coatings such as β-$MnO_2$, $RuO_2$ are used. As an additional disadvantage, the Ti anode surface must be treated after only a few cycles of deposition and stripping.

The reaction for production of ozone from water at an anode is:

$$3H_2O = O_3 + 6H^+ + 6e^- \quad E^o = +1.6 \text{ V} \qquad (1)$$

An oxygen evolution reaction competes with the ozone reaction:

$$2H_2O = O_2 + 4H^+ + 4e^- \quad E^o = +1.23 V \quad (2)$$

At the cathode either of two reactions may be selected, namely hydrogen evolution:

$$2H^+ + 2e^- = H_2 \quad E^o = 0.0 V \quad (3)$$

or oxygen reduction:

$$O_2 4H^+ + 4e^- = 2H_2O \quad E^o = -1.23 V \quad (4)$$

Several electrolytic processes for producing ozone have been described in the art. In one such process, $O_3$ is evolved into a stream of water from the back of a porous $PbO_2$ anode in contact with a solid polymer (perfluorinated sulfonic, Nafion ®, membrane) electrolyte (reaction 1). Hydrogen evolution (reaction 3) is the cathodic reaction. See Stucki et al., Abstract No. 573, *The Electrochemical Society*, Extended Abstracts, Vol. 83-1, p. 866, San Francisco, May, 1983. The advantages of this approach are that high current densities are obtained, the $PbO_2$ electrode is more stable with the solid polymer than with an acid electrolyte, the ozone is dissolved directly in the stream of water and used for water treatment, avoiding the hazards of gaseous ozone, and the reaction can be run at room temperature. A disadvantage is the high voltage of the reaction, which increases the power consumption.

According to another known process, $O_3$ is evolved as a gas at a glassy carbon electrode in tetrafluoroboric acid (reaction 1). Lead dioxide cannot be used as an electrode material because it is not stable in tetrafluoroboric acid. The cathodic reaction is oxygen reduction (reaction 4). See generally, Foller et al., *Ozone: Science and Engineering*, Vol. 6, pp. 29-36, 1984, and Foller et al., U.S. Pat. Nos. 4,316,782, issued Feb. 23, 1982 and 4,541,989, issued Sept. 17, 1985. A stream of air is passed over the air electrode. Advantages of this approach are that power consumption is lower due to the lower overall cell voltage with oxygen reduction compared to hydrogen evolution, there is no need to add water to maintain the material balance of the cell, since oxygen is reduced to form water, and hydrogen, which can be hazardous, is not evolved. Disadvantages are that the maximum current density of an air cathode is low (about 250 mA/cm²), the anode must be cooled to about 0° C. (this adds complexity and cost), and the ozone gas must be immediately diluted with $O_2$ to prevent explosions. The diluted ozone/oxygen stream also remains hazardous.

Other electrolytes which have been used to produce ozone are sulfuric acid, phosphoric acid, and various electrolytes containing fluoride ions. The advantage of the fluoride ions is that they reduce the rate of competing oxygen evolution (reaction 2) and hence increase the current efficiency of ozone production.

Foller and Tobias (See *J. Electrochem. Soc.*, Vol. 129, pp. 506-515 and 567-570, 1982) and Kotz and Stucki (*J. Electroanal. Chem.*, Vol. 228, pp. 407-415, 1987) have shown that ozone can be produced at lead dioxide anodes in sulfuric acid solutions. The efficiency of the process is low because oxygen evolution (reaction 2) competes with ozone production. Another problem is that the lead dioxide is not stable. Kotz and Stucki concluded that there is a need for a conductive anode material with a high overpotential for the oxygen evolution reaction.

The present invention provides electrodes used in lead-acid batteries and in electrolytic processes which can meet the foregoing needs.

SUMMARY OF THE INVENTION

The invention provides an electrode containing an electrically conductive ceramic material, specifically a sulfuric acid-resistant, inorganic metal oxide generally having a perovskite structure. Electrodes according to the invention include lead-acid battery electrodes, such as plates, tubular electrodes or bipolar electrodes, and electrodes for use in electrolytic processes. In a positive lead-acid battery plate of the invention, the conductive ceramic serves as an additive which enhances the formation of a lead-acid battery plate. The conductive ceramic additive does not participate in the electrode reaction, for example, in the manner of lead dioxide in positive lead-acid battery plates. An electrode according to the invention is especially suitable for use as the positive plate of a lead-acid battery in combination with a negative plate also containing the ceramic of the invention, or instead containing carbon as the conductive additive. The electrode of the invention is also useful as the anode or cathode in an electrolytic cell wherein the reaction is conducted in an aqueous sulfuric acid solution.

According to further aspects of the invention, a bipolar electrode for use in a bipolar lead-acid battery includes a substrate and layers of positive and negative active material disposed on opposite sides of the substrate. The substrate contains the foregoing conductive ceramic as a filler, and a polymeric binder. The invention further provides an electrode, particularly an anode (positive electrode) for use in conducting electrolytic processes, particularly those conducted in sulfuric acid solutions, in several forms including a current collector coated with a conductive ceramic layer, or a solid conductive ceramic plate.

BRIEF DESCRIPTION OF THE DRAWING

The invention will be further described with reference to the accompanying drawing, wherein like numerals denote like elements, and.

DETAILED DESCRIPTION

Figure 1:
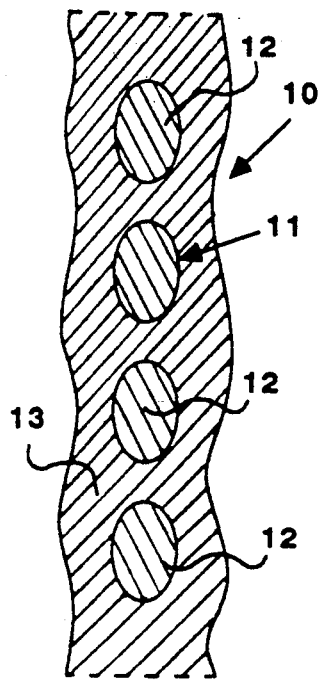
FIG. 1 is a partial, cross-sectional view of a lead-acid battery plate according to the invention.

According to the invention, an electrically conductive ceramic selected from a class of inorganic oxides generally having a perovskite structure is used in electrodes, especially in electrodes for use in sulfuric acid electrolytes. For such uses, the ceramic must first of all be conductive. Conductivity is essential to enhancing lead-acid battery plate formation and for use as an electrode in electrolytic processes. For purposes of the present invention, "conductive" means a conductivity of at least about 0.1 ohm$^{-1}$.cm$^{-1}$, preferably at least about 10 ohm$^{-1}$.cm$^{-1}$.

Second, the ceramic should be stable in water and aqueous sulfuric acid solutions. For purposes of the present invention, "sulfuric acid-resistant" means stable in dilute aqueous sulfuric acid having specific gravities in the range of 1 to 1.4, as commonly used in lead-acid batteries, at temperatures in the range of about $-40°$ C. to $80°$ C. Stability in up to 12 molar sulfuric acid solution at such temperatures is preferred. If the ceramic is attacked by the acid electrolyte, the structure of the resulting plate will be adversely affected.

Third, the ceramic usually needs to be electrochemically inert, i.e., it should not participate in the electrochemical reaction occurring in the battery or electrolytic process. Absent this characteristic, the ceramic has no lasting effects in the battery, or is consumed as part of the electrolytic process.

Finally, the ceramic should have a relatively large overvoltage for oxygen evolution if it is to be used as an anode in electrochemical reactions to be carried out in aqueous sulfuric acid solutions. Overvoltage refers generally to a voltage range which can be applied to a substance used as an electrode in such a solution without causing side reactions with the solvent, such as the reduction of water to evolve hydrogen or the oxidation of water to evolve oxygen. A large overvoltage allows a variety of electrochemical reactions to be conducted at more rapid reaction rates without undesirable side reactions.

When used in a positive electrode in a lead-acid battery, the conductive ceramic according to the invention preferably has an oxygen overpotential about the same as or greater than lead dioxide under like conditions, particularly when used in a lead-acid battery wherein the sulfuric acid electrolyte has a specific gravity in the range of about 1.001 to 1.4 at a temperature in the range of from about $20°$ C. to $80°$ C., especially $-40°$ C. to $80°$ C. When used in a negative electrode in a lead-acid battery, the conductive ceramic according to the invention preferably has a hydrogen overpotential about the same as or greater than lead under like conditions, particularly when used in a lead-acid battery wherein the sulfuric acid electrolyte has a specific gravity in the range of about 1.001 to 1.4 at a temperature in the range of from about $20°$ C. to $80°$ C., especially $-40°$ C. to $80°$ C. In other words, the conductive ceramic preferably has an oxygen overpotential not less than the overpotential of the positive electrode reaction, and/or a hydrogen overpotential not less than the overpotential of the negative electrode reaction, at an acid concentration and temperature within the foregoing ranges.

Few inorganic oxides have all of the foregoing characteristics. Most perovskite materials are either non- or semi-conductive, or are not stable in sulfuric acid. For example, BaBiO$_3$ and BaSnO$_3$ are non-conductive. SnPbO$_3$ is conductive, but has limited stablity in sulfuric acid solutions.

Accordingly, preferred conductive ceramics according to the invention are made of one or more compounds of formula:

$$A_aB_bO_c$$

wherein A is Sr, Ba, Zn, Cd, Ra or a combination thereof, B is Zr, Sn, or Pb, and $0.5 \leq a \leq 1$, $0.5 \leq b \leq 1$, and $2 \leq c \leq 3$, optionally containing small amounts of other elements such as Bi, Ag, K, Li Ti, Nb, Al, Cr, Zn, Mn, Mg or Ca, and the resulting compound is substantially stable in sulfuric acid, has a conductivity of at least about 0.1 ohm$^{-1}$.cm$^{-1}$, and can be used as an electrode in an aqueous sulfuric acid solution without generating excessive oxygen when used in a positive electrode, or without generating excessive hydrogen if used as a negative electrode. Suitable ceramics include compounds having the formula $A_aB_bO_c$, wherein A is Sr, Ba, Zn, Cd or Ra, B is Zr, Sn or Pb, $0.5 \leq a \leq 1$, $0.5 \leq b \leq 1$, and $2 \leq c \leq 3$. A subclass of compounds wherein B=Pb, a=1 and c=3 is especially preferred. Most preferred is substantially pure barium metaplumbate, BaPbO$_3$. Other compounds useful in varying degrees as the ceramics according to the invention include ZnSnO$_3$, CdSnO$_3$, ZnPbO$_3$, CdPbO$_3$, Cd$_2$PbO$_4$ (CdPb$_{0.5}$O$_2$) and CdPb$_2$O$_5$ (Cd$_{0.5}$PbO$_{2.5}$). Although barium metaplumbate and closely similar compounds used in the present invention all exist in the perovskite crystal structure, it has not been established that such a crystal structure is essential for purposes of the present invention.

Such compounds may contain relatively high levels of impurities and still prove useful for purposes of the present invention. Thus, equivalents of the foregoing compounds can include, for example, compounds of the formula:

$$M_{(1-x)}Y_{(x+z)}Pb_{(1-z)}O_3$$

wherein M is Ba, Zn, Cd or Ra, Y is Bi or Sr, x and z, which may be the same or different, are in the range of from about 0 to 0.35, the sum of x and z is not greater than about 0.5. Substantially pure barium metaplumbate performs better than composites containing Sr or Bi because composites incorporating strontium or bismuth therein show progressively decreasing stability in sulfuric acid related to the amount or Sr or Bi present.

Barium metaplumbate shows excellent stability in sulfuric acid, but is unstable in other common acids, including nitric, hydrochloric, and acetic acids. In alkaline solution, BaPbO$_3$ is sparingly soluble and can form a hydroxide, for example, BaPb(OH)$_6$. Its use is thus limited to acid electrolytes in which it is stable, and neutral electrolytes. Barium metaplumbate also has a high oxygen overpotential and a high hydrogen overpotential when employed in conventional lead-acid batteries. In particular, it has an oxygen overpotential about the same as or higher than that of PbO$_2$ under typical lead-acid battery conditions. It is thus especially suited for use in positive battery plates. In the negative battery plate, barium metaplumbate has been found to have a higher hydrogen overpotential than lead under typical lead-acid battery conditions.

Lead-acid battery electrodes are commonly made by applying a paste containing lead compounds to a lead grid. The conductive ceramic additive of the invention may be incorporated directly into positive or negative lead-acid battery paste mixtures. In such pastes, the amount of the conductive additive according to the invention, based on the total solids and assuming 100% purity, is generally in the range of from about 0.01 to 50 wt. %, preferably about 0.05 to 8 wt. % for positive plates. Formation enhancement effects level out at about 8 wt. %; at concentrations less than 0.1%, the improvement in formation becomes minimal.

The conductive ceramic of the invention is conveniently added to the paste mixture in powder form. The particle size of the conductive ceramic powder used to make a paste according to the invention is not critical, but the particles should generally be sufficiently small to allow the conductive ceramic to be evenly distributed throughout the paste and in the resulting layer of positive active material. Conductive ceramic particles ground to an average particle size (diameter) in the range of from about 0.1 to 40 microns have proven useful for purposes of the present invention. The conductive ceramic can also be used in other forms, for example, as a coating for fibers or as a composite material.

As the examples below demonstrate, it is not usually necessary that the conductive ceramic additive according to the invention for use in lead-acid battery plates be of high purity. Impurities such as unreacted starting materials may be present. However, the purity of the ceramic should be taken into account when determining the amount of the ceramic used. Further, some impurities, such as $BaSO_4$ and $SrSO_4$, can reduce cycle life of the battery. It is thus preferred that the conductive ceramic for use in making electrodes according to the invention contain no more than about 10 percent by weight Ba or Sr salts which can react to form barium or strontium sulfate.

Standard paste ingredients, including lead oxide (PbO, $Pb_3O_4$, etc.), sulfuric acid, water and various well-known additives, such as fibers and expanders, may be used in conventional amounts. A solid mixture for making a battery paste according to the invention may contain, as solids, up to 0.5 wt. %, especially 0.05 to 0.4 wt. % fiber, up to 3 wt. %, especially 0.5 to about 2.1 wt. % expander (negative plate only; 0% for positive plates), 0.01 to 50 wt. % of the conductive ceramic according to the present invention, and the balance lead oxide(s), including any free lead present in the lead oxide. Preferably, these ranges are 0.5 to 0.4 wt. % fiber, 0.5 to about 2.1 wt. % expander (negative plate only; 0% for positive plates), 0.5 to 8 wt. % of the conductive ceramic according to the invention, and the balance lead oxides.

Fibers are used in both positive and negative paste mixes as a binder to improve the handling characteristics of the battery plates after pasting. Suitable fibers include fiberglass, tin or tin dioxide-coated fiberglass, carbon fibers, synthetic plastic fibers such as modacrylic fibers, and mixtures thereof. Such fibers typically have a fineness of about 2 to 4 denier and lengths in the range of 0.15 to 0.35 cm. Specific gravity of modacrylic fibers useful in pastes according to the invention is in the range of about 1.2 to 1.5 gm/cc. Suitable expanders include carbon black (also a colorant), lignins or their synthetic equivalents, barium sulfate, and mixtures thereof.

In one embodiment of a lead-acid battery according to the invention, the positive electrode contains a conductive ceramic according to the invention and the negative electrode does not. However, negative plate formation poses problems if the lead oxide used to make the paste has a very low free lead content, i.e. less than about 0.2 wt. % of the lead oxide. This problem can be remedied by incorporating therein an amount of high surface area carbon effective to enhance the formation process without adversely affecting battery performance. For this purpose, from about 0.5 to 0.5 wt. %, especially 0.1 to 0.2 wt. % of carbon based on the total solids present may be incorporated into the negative paste mixture. The foregoing amounts are in addition to any carbon already present in the expander mixture.

A typical paste mixture according to the invention contains (1) a lead sulfate compound selected from lead sulfate, and mono-, tri- or tetrabasic lead sulfate, (2) a lead oxide compound selected from o-PbO, t-PbO, and $Pb_3O_4$, (3) an amount of the conductive ceramic material according to the invention sufficient to enhance the formability and/or other properties of the resulting plate, (4) water in an amount effective to provide a flowable paste, and optionally (5) other additives such as carbon, fiber and expander. A preferred battery paste for making positive plates according to the invention contains, as solids and after a portion of the initial lead monoxide has reacted with sulfuric acid to form lead sulfate(s), about 55-60 wt. % lead sulfate or basic lead sulfate(s), 40-44 wt. % PbO, and 0.05-8 wt. % of the conductive ceramic additive according to the invention, optionally also including expander and 0.001-0.002 wt. % fiber. The water content of such a paste is in the range of about 0.15-0.2 ml/gm of solids.

Battery plates used in lead-acid batteries according to the invention are made by any well-known process, for example, by applying the foregoing paste to the surface of a battery plate and forming the paste into an active material. In general, the paste is made by adding sulfuric acid and water to lead oxide to form lead sulfate or basic lead sulfate compounds in a mixture with excess unreacted lead oxide, optionally containing free lead, lead dioxide, and other conventional additives. This may be done by first weighing out a predetermined amount of lead oxide into a weigh hopper and dumping the lead oxide into a batch mixer, such as a mulling mixer. Dry additives such as fiber, expander and the conductive ceramic according to the invention are directly added into the mixer. The resulting mixture is dry mixed for several minutes so that the additives are dispersed throughout the oxide. Water is then added as needed to make a paste of the desired consistency. Excessively moist or dry paste render pasting impossible. The wet mixture is mixed for a short time to wet out the lead oxide. Sulfuric acid is then added as mixing continues until the temperature peaks at about 65° C. and then drops to the range of 43°-49° C. The acid is added gradually to prevent the paste from overheating. The resulting paste is then cooled by evaporation of water and conduction to the mixer. Such a lead-acid battery paste is generally made in a batch reactor, although continuous processes have been proposed and could be used.

Referring to FIG. 1, an electrode (positive plate) 10 of the invention is made by the conventional process of applying the foregoing paste to a flat grid 11 comprising grid elements 12 made of a lead alloy, such as lead-antimony or lead-calcium. The conductive ceramic according to the invention is incorporated in the paste in the form of fine, uniformly distributed particles. The plate is then, if necessary, flash-dried and cured. The plate is then formed (charged) to obtain a layer of active material 13 containing the conductive ceramic of the invention homogenously dispersed therein. Formation may be carried out either before or after the plate is assembled into a battery casing together with a negative plate, a separator, and the electrolyte.

Another method of making a positive battery plate, commonly called the tubular plate process, is used in the manufacture of traction and stationary batteries. In this process, tubes are constructed from woven, braided or felt polyester, glass, or other sulfuric acid and oxygen-resistant fibers. The tubes are shaped in a suitable solution under thermal treatment. The current collector, commonly called the spine, is a hard lead rod centered in each tube by, for example, star protrusions. The spine is typically made by casting molten lead under high pressure. The tubes are pulled over the spines and then filled with leady oxide materials such as t-PbO and o-PbO mixed with $Pb_3O_4$ in either a powder or slurry form. The oxide mixture is vibrated to settle it into a more compact form inside the tube.

Following the tube filling process, the tubular plate is immersed in sulfuric acid solution for several days. During this process, lead sulfate and basic lead sulfates form and $Pb_3O_4$ decomposes to lead sulfate materials and $PbO_2$, thus enhancing the conductivity of the paste. The use of $Pb_3O_4$ thus improves the efficiency of the formation process by forming $PbO_2$. In a tubular electrode according to the invention, the conductive ceramic of the invention is incorporated into the oxide mixture, reducing or eliminating the need to add $Pb_3O_4$.

Figure 2:
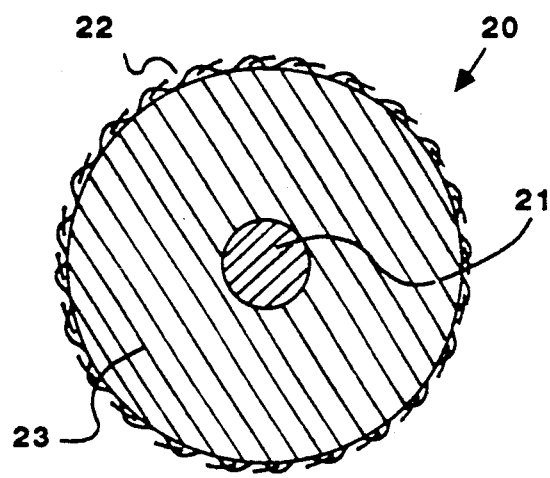
FIG. 2 is a cross-sectional view of a tubular lead-acid battery electrode according to the invention.

FIG. 2 illustates a tubular electrode 20 of the invention made according to the foregoing process for use in a lead-acid battery. Electrode 20 includes a central current collector rod 21, a tubular sheath of fabric mesh 22, and annular layer of active material 23 interposed between collector 21 and mesh 22. Active layer 23 contains the conductive ceramic material according to the invention. An electrode of this type need not be symmetrical, and can include a series of spaced collectors 21.

Figure 6:
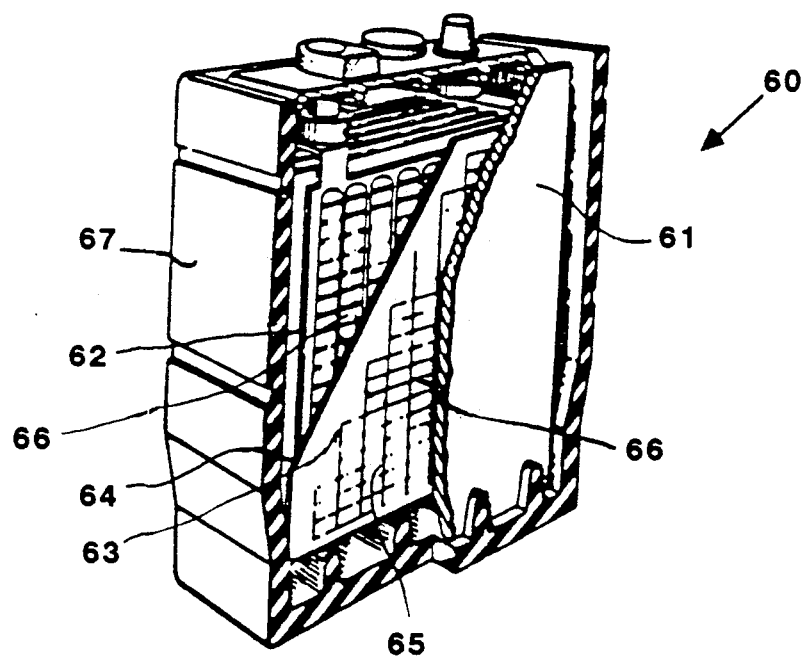
FIG. 6 is a perspective, cut-away view of a lead-acid battery according to the invention.

Referring to FIG. 6, the foregoing electrode plates are combined with several other components to make the lead-acid battery 60. Battery 60 according to the invention includes a conventional casing 67 which houses two or more cells defined by a partition 61. Each cell includes a positive lead dioxide electrode 62 containing the conductive ceramic according to the invention, a negative lead electrode 63, a separator 64 interposed between the electrodes, and an aqueous sulfuric acid electrolyte in which the electrodes and separator are immersed. Electrodes 62, 63 each comprise lead grids 65 having active material 66 deposited thereon. The casing, separator, negative electrode (plate) and the electrolyte may be of conventional design and need not be described in detail. See, for example, Biagetti, U.S. Pat. No. 3,765,943, issued Oct. 16, 1973, the contents of which are hereby expressly incorporated by reference herein. The electrolyte may be a liquid, or may be gelled or immobilized by absorption in the separator.

The conductive ceramic according to the invention can also be applied as a non-corrosive protective coating to battery components other than electrodes, such as current collectors made of copper, lead, aluminum, or other metals, and also spines, posts, strips, tabs, cast-on straps, intercell connectors, end plates, and any other standard current-carrying components for a lead-acid battery. The coating can be applied either as the solid ceramic (by sintering or vacuum sputtering) or as a paint or filled polymer. Such a paint may, for example, comprise particles of conductive ceramic dispersed in an adhesive, such as epoxy, or a polymer such as polyethylene, polypropylene, or polyethylene terephthalate. $BaPbO_3$ coating can be carried out by DC diode or DC triode sputtering techniques, or by evaporation deposition. Reactive sputtering is another method for depositing a $BaPbO_3$ coating in which a Ba/Pb alloy of 1:1 molar ratio is used as the target and $O_2$ as the sputtering gas. By properly adjusting the sputtering parameters, $BaPbO_3$ is formed during the process and then deposited onto the substrate.

Figure 3:
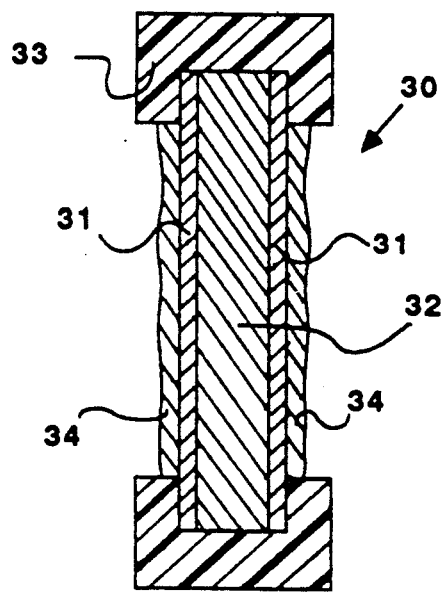
FIG. 3 is a cross-sectional view of an undercoated electrode according to the invention.

Referring to FIG. 3, a hot pressing method according to the invention can also be used to prepare a coated electrode 30. According to this method, a layer of conductive ceramic powder, e.g. $BaPbO_3$, is placed in a chase and hot-pressed by a platen heated to about 800°–1000° C. to form a sintered $BaPbO_3$ layer. A sheet of lead is then placed in the chase over the ceramic layer and hot-pressed to melt the lead, or molten lead may be poured over the ceramic layer, to form a bilayered plate upon cooling. Two such bilayered plates may then be placed in the chase with the lead layers of each plate in face-to-face contact, and hot-pressed or soldered together to form a trilayered plate having surface layers 31 of ceramic over with a layer 32 of lead (or lead alloy) interposed therebetween. In the alternative, the second layer 31 may simply be formed by a third hot-pressing step directly over the first-formed lead layer. A frame 33 of plastic such as polyethylene may be secured about the edges of the plate to protect exposed edges of lead layer 32. The resulting electrode is suitable for use in electrolytic processes.

To make a positive plate for a lead acid battery, layers 34 of positive active material may then be pasted over layers 31. Layers 31 thereby protect the underlying lead layer (plate) 32 from corrosion. In the alternative, an electrode as shown in FIG. 3 may be made by simply applying an adhesive paint containing the conductive ceramic directly over a lead plate, grid, or the like, and then applying the active material thereover.

The conductive ceramic according to the invention can also be used as a filler material in a bipolar electrode substrate for a bipolar lead-acid battery, for example, of the type described in Biddick, U.S. Pat. No. 4,098,967 or Poe U.S. Pat. No. 3,795,543, the entire contents of which patents are hereby expressly incorporated herein by reference.

Figure 4:
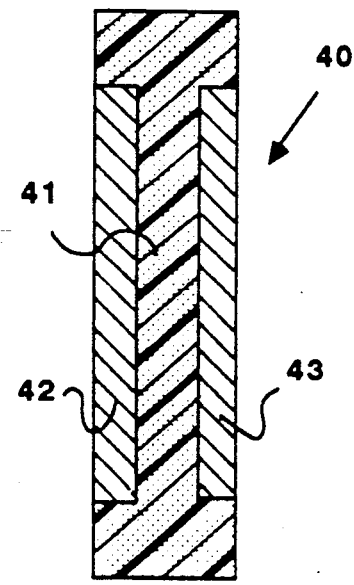
FIG. 4 is a cross-sectional view of a bipolar lead-acid battery electrode according to the invention.

Referring to FIG. 4, a bipolar electrode 40 of the invention generally comprises a substrate (plate) 41 made of a sulfuric acid-resistant plastic matrix in which fine particles of the conductive ceramic are dispersed. Layers 42, 43 of positive and negative active lead materials, respectively, are formed on opposite sides of substrate 41. The average particle size of the particles used in substrate 41 is generally in the range of about 0.1 to 5 $\mu$m. For purposes of the present invention, polyethylene, polypropylene, PET and similar plastics having suitable strength and resistance to sulfuric acid can be used. In particular, a preferred polyethylene according to the invention has a molecular weight of from 200,000 to 300,000, a peak melting point of about 135° C. or higher, and a strength of from 3000 to 5000 psi. Such PE plastic also typically has a conductivity of about $10^{-16}$ $ohm^{-1}.cm^{-1}$, a density of about 0.96 $g/cm^3$, and an elastic modulus of about 50,000–80,000 psi.

In a bipolar battery according to the invention, the carbon filler described in the Biddick et al. patent is replaced with the conductive ceramic according to the invention in comparable amounts, for example 20 to 95% by volume, particularly about 45 to 60% by volume in the bipolar electrode. Otherwise, a bipolar battery of like configuration to Biddick et al., including a stack of bipolar electrodes coated on opposite sides with positive and negative lead-acid active materials and having separators interposed therebetween, may be constructed according to the present invention. The conductive ceramic accordingly can avoid the drawbacks of carbon as a conductivity additive for a bipolar electrode. For example, a large amount of carbon must be used to obtain the desired level of conductivity, but this can make the resulting material too porous for use as a bipolar electrode substrate. Carbon also has poor stability in sulfuric acid electrolyte when used in a positive electrode.

The utility of electrodes according to the invention is not limited to lead-acid batteries. For example, an electrode for use in electrolytic synthesis according to the invention generally comprises a conductive substrate coated with a conductive ceramic material, such as barium metaplumbate. FIG. 3, with layers 34 removed, illustrates such an electrode.

Figure 5:
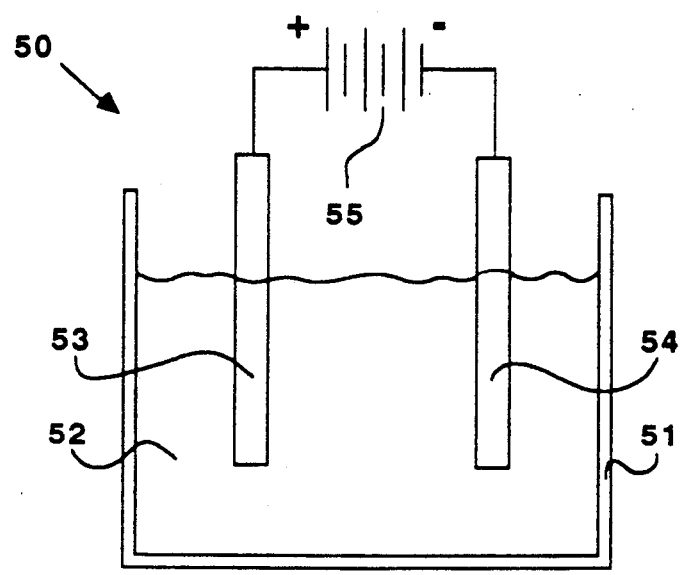
FIG. 5 is a schematic diagram of an electrolytic apparatus according to the invention.

FIG. 5 exemplifies an electrolytic system 50 according to the invention. An anode 53 is immersed into a tank or similar container 51 of an acid solution 52 containing the reactant(s) for the desired reaction, together with a counterelectrode (cathode) 54 made of lead, lead dioxide, carbon, a noble metal, or a similar material. A voltage is applied by suitable means 55, such as a battery, DC power supply, or the like, so that the desired product forms at the anode as a solid, liquid, gas or dissolved substance. If the product deposits on the anode as a solid, the anode is removed from the acid, then preferably washed and dried. The product is then stripped from the anode surface.

Conductive ceramics according to the invention, such as barium metaplumbate, are stable in sulfuric acid and relatively easy and inexpensive to prepare. Thus, by coating a conductive substrate made of metal, ceramic, or carbon with a mixture of barium and lead oxides (or their equivalents) followed by calcination in an oxygen environment at a high temperature, a barium metaplumbate electrode can be formed for use in electrolytic processes. Alternatively, barium metaplumbate may be embedded in an inert, conductive or nonconductive matrix, such as a polymer (e.g. polyethylene, polypropylene, PET) or carbon (graphite, carbon black, Ketjenblack) to form the anode. A solid ceramic electrode can also be made by sintering conductive ceramic powder according to the invention to form a plate. The advantages of using a conductive ceramic anode according to the invention include reduced cost and extended anode service life.

According to one example of an electrolytic process according to the invention, electrolytic manganese dioxide (EMD) is produced by electrochemically depositing $MnO_2$ onto an inert anode in a bath containing $MnSO_4$ and sulfuric acid at a high temperature, e.g. at least 60° C. As another example, a conductive ceramic anode according to the invention can be used in any of several known processes for the production of ozone. Conductive ceramics according to the invention can satisfy the citeria proposed by Kotz and Stucki, as discussed above. Barium metaplumbate is stable in sulfuric acid, is as conductive as lead dioxide, has a high oxygen overpotential, and is easy to prepare. Thus, an anode according to the invention can be used as an anode material to increase the current efficiency in ozone production.

Barium metaplumbate can be directly substituted for the lead dioxide in the method of Stucki et al. cited above, or used in a further process as follows. A conductive anode containing barium metaplumbate is immersed in aqueous sulfuric acid (or another electrolyte in which barium metaplumbate is stable) at temperatures in a preferred range from about 0° to 30° C. The cathode, made of a conductive material such as platinum, carbon or nickel, is used to evolve hydrogen, which is removed. A stream of water flows past the anode to dissolve and collect the ozone formed. An expensive solid polymer electrolyte, such as polyethylene oxide, is not required in this process because barium metaplumbate is stable in sulfuric acid. Acid electrolytes are lower in cost and more conductive than solid polymer electrolytes. Low temperature operation is not required and high current densities can be obtained.

The hydrogen which is formed by the cell reaction is a useful byproduct. For example, it can be fed into a fuel cell or a nickel-hydrogen cell to produce electricity, or used as a reactant in another chemical or electrochemical process. In a typical complete system, the ozone produced is used, for example, for treatment of a cooling tower, or a swimming or decorative pool, to oxidize bacteria and organic materials. The hydrogen is fed to a hydrogen fuel cell used to power the lights or water heater of the same installation.

Conductive ceramic electrodes according to the invention may also be used in other known electrolytic processes which are conducted in a sulfuric acid environment using a lead or lead oxide electrode. Such processes include the synthesis of acetylene dicarboxylic acid from 2-butyne-1,4-diol using a lead dioxide anode, adiponitrile from acrylonitrile using a lead cathode, hexahydrocarbazole from tetrahydrocarbazole using a lead cathode, α-methyldihydroindole from α-methylindole using a lead cathode, dihydrophthalic acid from phthalic anhydride using a lead cathode, piperidine from pyridine using a lead cathode, and anthraquinone from anthracene using a lead dioxide anode. Electrodes for use in electrolytic processes in other solutions in which the conductive ceramic of the invention is stable may also be prepared.

Several embodiments of the invention are hereafter illustrated in the following experimental examples:

EXAMPLE 1

Equimolar amounts of $Ba(NO_3)_2$ and PbO were mixed together and then heated without prior compression in a crucible furnace at 750° C. into an oxygen stream for 5 hours. Gaseous $NO_2$ evolved during the reaction is purged through a 40% KOH aqueous solution. The resulting $BaPbO_3$ removed from the furnace had a resistivity of about 1 mΩ·cm and a purity of about 57% by weight, the balance being $Ba_2PbO_4$, PbO, BaO and $Ba(NO_3)_2$. The product containing $BaPbO_3$ was then ground to a powder that passed through a 325 mesh screen.

A control paste (100 grams) was prepared by combining the following ingredients:

| | |
|---|---|
| o-PbO (powder, no free lead) | 78.0 gm |
| Sulfuric acid, specific gravity 1.325 | 6.6 ml |
| Modacrylic fibers, 1/16" long, 1.3 gm/cc | 0.05 gm |
| Water | 12.8 ml |

The sulfuric acid used contained about 42-43% by weight acid, the balance being water. The solids were premixed. The acid was then added to the dry mixture and thoroughly mixed therein to cause the sulfate reaction to proceed. The water was added last, and the mixture was again mixed to form a uniform paste. A paste according to the invention was prepared in the same manner, except that 7.8 gm (about 10 wt. % based on the solids) of the $BaPbO_3$ powder prepared above was added to the mixture.

The control and test pastes were uniformly coated on respective conventional lead-calcium alloy electrode grids of dimensions 6 by 4 by 0.13 cm to a thickness of about 0.1 to 0.15 cm, and allowed to dry by standing at room temperature over night. The resulting grids (7 controls and 7 plates according to the invention) contained about 11-13 grams of active material.

The grids were immersed in 150 ml of 1.185 specific gravity (SG) aqueous sulfuric acid in a standard lead acid battery including a pair of negative plates and a polypropylene separator, so that the positive plate was sandwiched between the two negative plates and separated therefrom by the separator, which was folded over both sides of the negative plate. An $Hg/Hg_2SO_4$ reference electrode was also immersed in the acid electrolyte to one side of the test element. A current of 750 mA, which amounted to 17-18 $mA/cm^2$ when both sides of the positive grid were included, was applied to effect formation of the plates. Formation was continued for 8 hours. At the end of the 8-hour test period, the control plates were less than 20% formed. The plates according to the invention, on the other hand, were nearly completely formed after about 6.5 hours.

EXAMPLE 2

The procedure of Example 1 was repeated, except that the control paste was prepared by combining the following ingredients:

| | |
|---|---|
| o-PbO (powder, no free lead) | 440.0 gm |
| $3PbO.PbSO_4.H_2O$ | 383.0 gm |
| Modacrylic fibers, 1/16" long, 1.3 gm/cc | 0.91 gm |
| Water | 180.0 ml |

A paste according to the invention was then prepared by adding about 10 wt. % of the $BaPbO_3$ product to the control mixture, as described in Example 1. Formation was continued for 5 hours under the same conditions as employed in Example 1, except that the current density applied was 28-29 $mA/cm^2$. At the end of the test period, the control plates were less than 15% formed. The plates according to the invention, on the other hand, were nearly completely formed after about 3.5 hours.

EXAMPLE 3

The procedure of Example 1 was repeated, except that the control paste was prepared by combining the following ingredients:

| | |
|---|---|
| o-PbO (powder, no free lead) | 409.0 gm |
| $4PbO.PbSO_4$ | 591.0 gm |
| Modacrylic fibers, 1/16" long, 1.3 gm/cc | 1.1 gm |
| Water | 180.0 ml |

A paste according to the invention was then prepared by adding about 10 wt. % of the $BaPbO_3$ product to the control mixture, as described in Example 1. Formation was continued for 5 hours under the same conditions as employed in Example 2. At the end of the test period, the control plates were less than 15% formed. The plates according to the invention, on the other hand, were nearly completely formed after about 4 hours.

EXAMPLE 4

Figure 7:
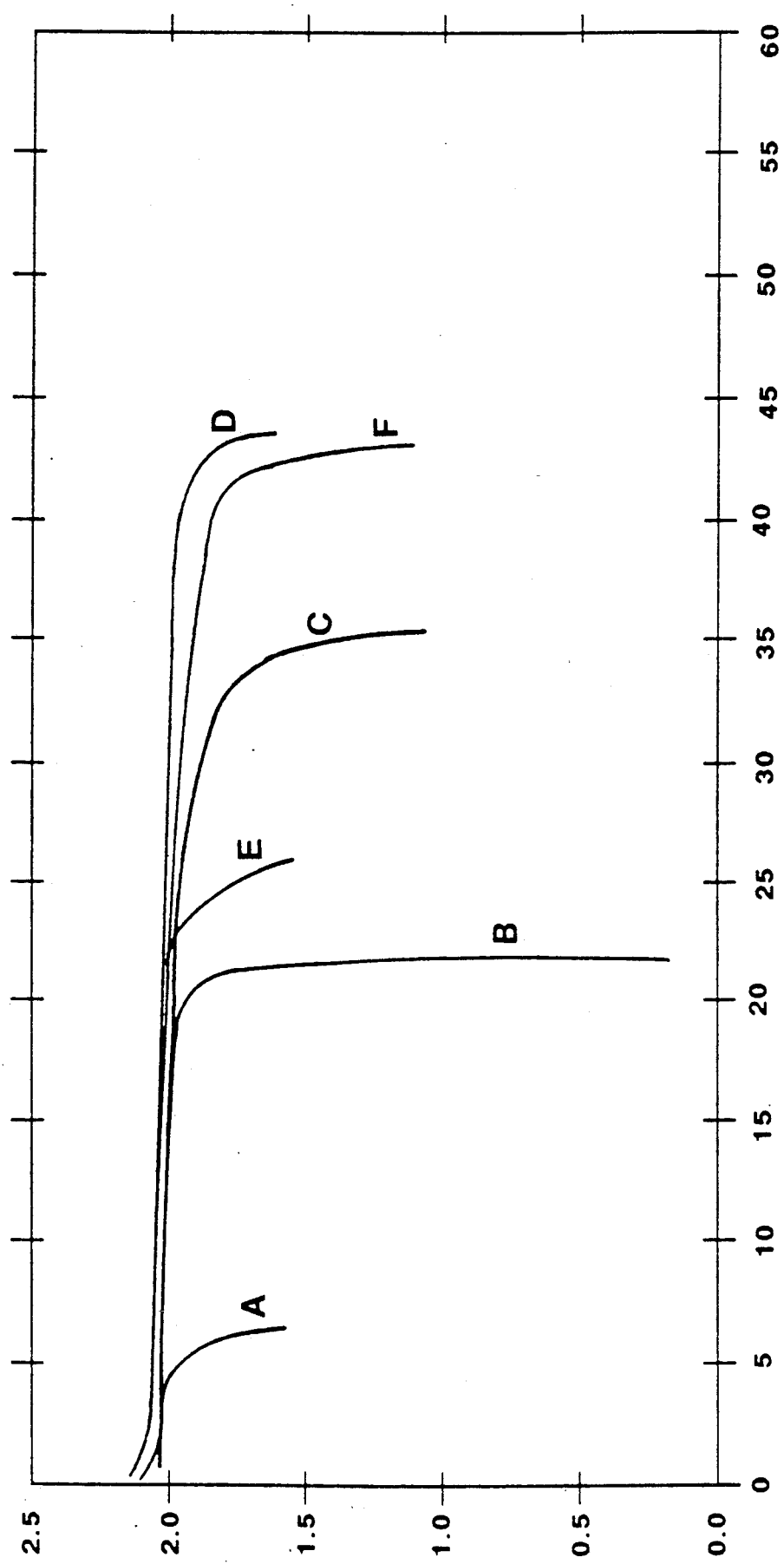
FIG. 7 is a graph plotting percent active material utilization versus cell voltage in volts indicating the reserve capacity of plates according to the invention and comparative plates, as described in Example 4.

The capacities of plates prepared in Examples 1-3 were measured according to the following procedure. The plates were discharged in 1.265 SG aqueous sulfuric acid at a constant current of 580 mA, which gave a current density of 13.3 $mA\cdot cm^2$. FIG. 7 sets forth the results, wherein percentage of active material utilization is plotted against cell voltage. The active material utilization percentage (x-axis) is determined by dividing the experimentally determined capacity with the theoretical maximum capacity for the total amount of active material present. The capacity was determined by a computer connected to a Bitrode cycler as the current multiplied by time. Curves A-F represent the plates of Examples 1-3 as follows:

| Curve | Example | Plate Paste Composition |
|---|---|---|
| A | 1,control | o-PbO |
| B | 2,control | o-PbO, tribasic lead sulfate (LS) |
| C | 3,control | o-PbO, tetrabasic LS |
| D | 1,invention | o-PbO, $BaPbO_3$ |
| E | 2,invention | o-PbO, tribasic LS, $BaPbO_3$ |
| F | 3,invention | o-PbO, tetrabasic LS, $BaPbO_3$ |

The cutoff voltage was set between 1.5-1.75 V, except that a 0 V cutoff voltage was employed for plate B.

The results show that the conductive barium metaplumbate additive enhanced the reserve capacities of all of the plates. A particularly large improvement was observed for the plate according to the invention made according to Example 1.

EXAMPLE 5

Deep Discharge/Current Acceptance Test

Current acceptance tests were conducted on two deeply discharged lead-acid test cells, one having positive plates containing barium metaplumbate and one control cell without barium metaplumbate. Current acceptance tests measure the rechargeability of deeply discharged battery plates. The current acceptance of deeply discharged batteries can be limited by the reduced conductivity of the heavily sulfated positive plate material. This test demonstrates that an inert conductive additive such as $BaPbO_3$ can improve the conductivity and subsequent current acceptance of deeply discharged positive plates.

The positive test plates were hand-pasted using a conventional paste mix made by the addition of 1.325 SG sulfuric acid to a water based mixture of ball mill leady oxide and 0.1 wt. % modacrylic plastic pasting fibers. The paste mix according to the invention, unlike the control mix, also contained 10 wt. % $BaPbO_3$ additive in the form of a preground, 325 mesh powder. The pasted plates were cured for 24 hours in 95% humidity at 120° F. The plates were then dried in air at room temperature for two days prior to their assembly into 7 positive/8 negative plate cells. Conventional cured negative plates were used in all cells. The assembled cells were then high rate formed at 165 amp-hours per pound of positive active material in 1.245 SG sulfuric acid.

Positive and negative plates were then taken from the formed full size cells to construct 1 positive/2 negative plate test cells which contained 130 ml of 1.265 SG sulfuric acid. These test cells were subjected to a standard test sequence of 2 cold crank tests alternately with 3 reserve capacity tests prior to the current acceptance tests described below.

The cells were then discharged for about 20 hours at approximately 2.8 amps per pound of positive material to a cutoff voltage of 1.5 volts per cell. Discharge of the cells was then continued by attaching a 2 ohm resistor across each cell. The resistors were left in place for 5 days, and then removed. The acid specific gravity in both cells was adjusted to 1.075 by dilution with water. The cells were then allowed to sit at open circuit for 5 more days.

The deeply discharged cells were then subjected to a constant voltage current acceptance test at 2.67 volts per cell. The cell having positive plates containing $BaPbO_3$ took only about 2 minutes to accept 10 amps of current, while the control cell took approximately 4 minutes to accept 10 amps of current. The greater rate of current acceptance by the cell containing $BaPbO_3$ confirms the greater rechargeability of deeply discharged positive plates according to the invention.

Visual observation of the formation process for positive plates according to the invention confirms that the conductive ceramic ($BaPbO_3$) forms a non-reactive, conductive, vein-like network in the active lead material. This network remains intact after formation, providing the enhanced deep discharge effects evidenced by this example. Lead dioxide, by contrast, provides no such advantage because it participates in the positive electrode reaction, i.e. is converted to lead sulfate when the battery is discharged.

EXAMPLE 6

Effect of Conductive Ceramic Content

A series of grids were pasted according to the procedure of Example 1 from o-PbO, except that the amount of $BaPbO_3$ added was varied to determine the effect of conductive ceramic content on active material utilization. Levels of 0, 0.1, 0.5, 1, 5 and 10 percent were employed to prepare otherwise identical plates. These plates were immersed in 1.185 SG sulfuric acid, and formed at 200 Amp-hours/lb for 8 hours. Initial capacity at 0.58 Amp was measured, and the utilization of $PbO_2$ was calculated. The results indicated that the improvement in active material utilization leveled out between 8-10 wt. % of barium metaplumbate at an active material utilization of about 45%.

EXAMPLE 7

A. Synthesis of Barium Metaplumbate

A 1:1 molar ratio of $BaCO_3$ and PbO were mixed in a jar on a vibratory mixer for 15 minutes. The mixture was then sintered in a crucible furnace at 1000° F. for 5 hours in air. The sintered material was pulverized and sieved through a 325 mesh screen, then 75 g of the ground and sieved material was placed in a ball mill with about 100 ml methanol and milled for 16 hours. The resulting slurry was dried, and the dried cake was again pulverized and sieved through a 325 mesh screen to yield a powdered conductive ceramic according to the invention.

B. Preparation of a Bipolar Electrode Substrate

A 150 ml beaker was placed on a 370° C. hot plate, covered with a watchglass, and allowed to heat up. 2 gm of polyethylene (melting index=45) were added to the beaker and allowed to melt. Enough filler was added to yield the desired concentration (e.g., 2 gm polyethylene with about 26.3 gm $BaPbO_3$ from part A). The mixture was rubbed, mixed, and kneaded with a broadbladed steel spatula until a consistent mass was obtained. The mass was placed into the mold (preheated to 370° C. on a hotplate) and pressure was slowly applied with a Carver Press until the material flowed from the vent (between 5,000 and 10,000 psi). The mold was cooled while in the press with water circulated through the platens. The resulting anode contained about 55% by volume powdered $BaPbO_3$ in polyethylene. The resulting sheet is suitable for use as the substrate for a bipolar electrode in a bipolar lead-acid battery, and as an anode for the synthesis of manganese dioxide.

C. Electrolytic Synthesis of $MnO_2$

Electrolytic manganese dioxide was deposited on the anode prepared in part B from a solution of manganese sulfate and sulfuric acid. The size of the anode was 3.8×2.55×0.4 cm. From top to bottom, the resistance, measured using a voltmeter, was 30 ohms. The top portion of the electrode was mechanically contacted to a double string of platinum wire wound around the electrode. The cathode was a Pt spiral electrode, and the reference was an Ag/Ag+ electrode. The electrodes were inserted in 120 ml of an aqueous solution containing 1M $MnSO_4$ and 0.5M $H_2SO_4$ at a temperature of 94°±2° C. The anode surface exposed to the electrolyte was about 12.2 $cm^2$. The open circuit voltage of the anode was +0.562 V vs. the reference.

A current of 60 mAmp (about 5 mAmp/$cm^2$), corresponding to an equivalent deposition rate of 97 mg/hr., was applied to the cell. The initial voltage of the anode was 1.6 versus the reference electrode without stirring, but this dropped to 0.6-0.8 V when the solution was stirred. The total cell voltage was a constant 3.35 V. Assuming an anodic resistance of 15 ohms, an IR drop of 0.9 V was calculated, and this reduced the actual cell voltage to about 2.45 V. The deposition was continued for 24 hours to theoretically yield 2.3 g of electrolytic manganese dioxide.

After the deposition, the anode was removed from the solution, washed with deionized water and dried in an oven. The weight of electrolytic manganese dioxide recovered was 1.2 g. This was determined by substracting the final plate weight of 22.9 g from the initial plate weight of 21.7 g. The calculated yield may be lower than actual yield due to corrosion of the top portion of the electrode which was not immersed in the electrolyte. This material appeared to erode, which would have resulted in a lower weight for the final electrode. Based on the condition of the electrolyte after the deposition and the appearance of the electrolytic manganese dioxide surface, the current efficiency was probably close to 100%. The electrolytic manganese dioxide surface was very smooth and the thickness of the deposit was homogeneous. If the current efficiency had been lower than 90%, gas holes would have been observed in the manganese dioxide surface. The results of this example demonstrate that an electrode according to the invention performs well when employed for the electrolytic production of manganese dioxide.

EXAMPLE 8

Electrolytic Synthesis of Ozone

A cell was constructed using 3 electrodes (anode, cathode, reference) in a 200 ml beaker containing about 100 ml of sulfuric acid of specific gravity 1.185 (about 3 molar) at room temperature. The anode was a polyethylene sheet filled with 60 volume % barium metaplumbate powder which had been sieved through a 325 mesh screen. This powder was determined to contain about 57% barium metaplumbate, with the impurities being primarily lead monoxide.

The electrode had a higher resistance than is desirable due to the large amount of semiconductive PbO in the powder. The anodic area exposed to the electrolyte was about 13 cm$^2$. A platinum wire was used as the counter electrode and the reference was a standard calomel electrode. A constant 2 Amp current was applied to the cell for about 40 minutes, at which time the electrode melted near the top due to heating caused by the high resistance. During the process, 400 ml of gas was collected by water displacement. The gas was diluted into a 1000 ml flask. The ozone content in the gas was 20 ppm, which is equivalent to about 50 $\mu$g. This example illustrates the need to employ substantially pure conductive ceramic according to the invention to avoid excessive resistance in the anode for ozone synthesis.

EXAMPLE 9

BaPbO$_3$ Sputter Deposition

Approximately 80 grams of BaPbO$_3$ powder prepared as described in Example 7 above from a mixture of BaCO$_3$ and PbO is ball-milled and passed through a 325 mesh screen. The powder is pressed into a 2" disk in a steel die at a pressure of 15,000 psi. The disk is sintered in air at 1000° C. for 1 hour. The resulting pellet is ¼" thick with a porosity of approximately 30%.

A thin coating of BaPbO$_3$ is deposited on a substrate by the plasma discharge sputter coating process in which a RF (radiofrequency) planar magnetron sputtering system is used. During the process, the BaPbO$_3$ target is placed into a vacuum chamber which is evacuated and backfilled with argon to a pressure to sustain a plasma discharge. A negative bias is applied the target so that it is bombarded by the positive ions from the plasma. Molecules of BaPbO$_3$ are ejected from the surface by this bombardment and intercepted by the substrate which is positioned below the target. The substrate is made of any suitable substance, such as aluminum, copper, or any solid substance which is non-reactive with the plasma. Molecules reaching the substrate condense into a thin coating on the surface. A deposition rate of several nanometers per second is typical for a sputtering RF power of several hundred watts. The resulting thin-film coated plate is suitable for use as a battery component or electrode for use in electrolytic synthesis in aqueous sulfuric acid.

It will be understood that the foregoing description is of preferred exemplary embodiments of the invention, and that the invention is not limited to the specific forms described. Modifications may be made to the methods and materials disclosed without departing from the scope of the invention as expressed in the appended claims.

We claim:

1. In an electrode configured for use in a lead-sulfuric acid battery, including a conductive current collector and a layer of an active lead material in contact with said collector, the improvement which comprises an electrically conductive, sulfuric acid-resistant metal oxide of perovskite structure in contact with said layer, wherein said metal oxide consists essentially of a compound selected from the group consisting of BaPbO$_3$, ZnSnO$_3$, CdSnO$_3$, ZnPbO$_3$, CdPbO$_3$, Cd$_2$PbO$_4$, and CdPb$_2$O$_5$, and combinations thereof.

2. The electrode of claim 1, wherein said conductive metal oxide has an oxygen overpotential about the same as or greater than PbO$_2$ when employed under like conditions in a positive electrode of a lead-sulfuric acid battery.

3. The electrode of claim 1, wherein said conductive metal oxide has a hydrogen overpotential about the same as or greater than Pb when employed under like conditions in a negative electrode of a lead-sulfuric acid battery.

4. The electrode of claim 1, wherein said metal oxide is coated on said current collector.

5. The electrode of claim 4, wherein said metal oxide is coated on said current collector between said current collector and said layer of active lead material.

6. The electrode of claim 5, wherein said metal oxide consists essentially of a compound selected from the group consisting of BaPbO$_3$, ZnSnO$_3$, CdSnO$_3$, ZnPbO$_3$, CdPbO$_3$, Cd$_2$PbO$_4$, and CdPb$_2$O$_5$, and combinations thereof.

7. The electrode of claim 1, wherein said current collector consists essentially of lead.

8. In an electrode including a conductive current collector and an active lead material in contact with said collector, the improvement wherein said active material contains an electrically conductive, sulfuric acid-resistant metal oxide material which consists essentially of a compound of the formula A$_a$B$_b$O$_c$, wherein A is Sr, Ba, Zn, Cd, or Ra, B is Zr, Sn, or Pb, $0.5 \leq a \leq 1$, $0.5 \leq b \leq 1$, and $2 \leq c \leq 3$.

9. The electrode of claim 8, wherein said active lead material contains about 0.1 to 50 wt. % of said metal oxide.

10. The electrode of claim 8, wherein said electrode is a positive electrode in which said collector consists essentially of lead, and said active lead material comprises a lead sulfate compound which is converted to lead dioxide when said electrode is charged in a lead-sulfuric acid battery.

11. The electrode of claim 10, wherein said collector comprises a generally flat grid, and said active lead material forms a layer on said grid.

12. The electrode of claim 10, wherein said collector comprises an elongated rod, said electrode further comprises a sheath made of a sulfuric acid-resistant fiber mesh, and said active lead material is disposed between said collector and said sheath.

13. The electrode of claim 8, wherein said conductive metal oxide is selected from the group consisting of ZnSnO$_3$, CdSnO$_3$, ZnPbO$_3$, CdPbO$_3$, CdPb$_{0.5}$O$_2$, Cd$_{0.5}$PbO$_{2.5}$, and combinations thereof.

14. The electrode of claim 8, further comprising a layer consisting essentially of said metal oxide compound interposed between said collector and said active lead material.

15. The electrode of claim 8, wherein said conductive metal oxide has an oxygen overpotential about the same as or greater than PbO$_2$ when employed under like conditions in a positive electrode of a lead-sulfuric acid battery wherein the aqueous sulfuric acid electrolyte has a specific gravity in the range of about 1.001 to 1.4 and at a temperature in the range of about −40° to 80° C., and has a hydrogen overpotential about the same or as greater than Pb when employed under like conditions in a negative electrode of a lead-sulfuric acid battery wherein the aqueous sulfuric acid electrolyte has a specific gravity in the range of 1.001 to 1.4 and at a temperature in the range of about −40° to 80° C.

16. The electrode of claim 8, wherein A is Ba.

17. The electrode of claim 8, wherein said compound is barium metaplumbate.

18. The electrode of claim 17, wherein said active lead material contains from about 0.1 to 8 wt. % of barium metaplumbate.

19. In a lead-acid battery including a casing, positive and negative electrodes disposed in said casing, a separator interposed between said electrodes, and a sulfuric acid electrolyte in contact with said electrodes and separator, the improvement comprising:
one of said electrodes comprises a current collector, a layer of an active lead material in contact with said collector, and an electrically conductive, sulfuric acid-resistant metal oxide of perovskite structure in contact with said layer, wherein said metal oxide consists essentially of a compound of the formula $A_aB_bO_c$, wherein A is Sr, Ba, Zn, Cd, or Ra, B is Zr, Sn, or Pb, $0.5 < a < 1$, $0.5 < b < 1$, and $2 < c < 3$.

20. The battery of claim 19, wherein said current collector comprises a grid consisting essentially of lead, and said active lead material comprises a layer deposited on said grid and contains lead sulfate which is converted to lead dioxide when said electrode is charged in a lead-sulfuric acid battery.

21. The battery of claim 19, wherein said compound is barium metaplumbate.

22. The battery of claim 21, wherein said active lead material contains from about 0.1 to 8 wt. % of barium metaplumbate.

23. The battery of claim 19, wherein the improvement further comprises said negative electrode contains carbon therein.

24. The battery of claim 19, wherein said metal oxide consists essentially of a compound selected from the group consisting of $BaPbO_3$, $ZnSnO_3$, $CdSnO_3$, $ZnPbO_3$, $CdPbO_3$, $Cd_2PbO_4$, and $CdPb_2O_5$, and combinations thereof.

25. The battery of claim 19, wherein said current collector is a grid consisting essentially of lead.

26. A paste mixture, comprising particles of a lead oxide compound, a lead sulfate compound, and a conductive, sulfuric acid-resistant metal oxide of perovskite structure, said particles being dispersed in an amount of water effective to form a paste, wherein said metal oxide consists essentially of a compound selected from the group consisting of $BaPbO_3$, $ZnSnO_3$, $CdSnO_3$, $ZnPbO_3$, $CdPbO_3$, $Cd_2PbO_4$, and $CdPb_2O_5$, and combinations thereof.

27. The paste mixture of claim 26, wherein said lead oxide compound is selected from the group consisting of $PbO$, $Pb_3O_4$, and mixtures thereof, said lead sulfate compound is selected from the group consisting of $PbSO_4$, $PbO.PbSO_4$, $3PbO.PbSO_4.H_2O$, $4PbO.PbSO_4$, and mixtures thereof, and said metal oxide is $BaPbO_3$.

28. The paste mixture of claim 27, wherein solids in said paste consist essentially of 0.01 to 50 wt. % of $BaPbO_3$, up to about 0.5 wt. % of a fiber, and the balance is said lead oxide compound and said lead sulfate compound, and the amount of water in said paste is in the range of about 0.15 to 0.2 ml/gm of said solids.

29. In a method for the electrolytic synthesis of a product from a reactant in an aqueous reaction medium, including the step of applying an electrical current to said medium by means of electrodes including an anode and a cathode immersed therein to form said product, the improvement comprising:
at least one of said electrodes contains a conductive, sulfuric-acid resistant metal oxide of perovskite structure which remains unreactive during said electrolytic synthesis, wherein said metal oxide consists essentially of a compound selected from the group consisting of $BaPbO_3$, $ZnSnO_3$, $CdSnO_3$, $ZnPbO_3$, $CdPbO_3$, $Cd_2PbO_4$, and $CdPb_2O_5$, and combinations thereof.

30. The method of claim 29, wherein said compound consisting essentially of barium metaplumbate, and said medium is aqueous sulfuric acid.

31. The method of claim 29, wherein said reactant comprises $MnSO_4$, and said product comprises $MnO_2$.

32. The method of claim 29, wherein said reactant comprises water, and said product comprises ozone and hydrogen.

33. In a bipolar electrode for use in a lead-acid bipolar battery, including a conductive substrate having a pair of layers of positive and negative active material disposed on opposite sides thereof, the improvement wherein said substrate comprises:
particles of a conductive metal oxide which is substantially stable in aqueous sulfuric acid and consists essentially of a compound having the formula $A_aB_bO_c$, wherein A is Sr, Ba, Zn, Cd, or Ra, B is Zr, Sn, or Pb, $0.5 \leq a \leq 1$, $0.5 \leq b \leq 1$, and $2 \leq c \leq 3$; and
a substantially sulfuric acid-resistant binder in which said conductive particles are dispersed.

34. The bipolar electrode of claim 33, wherein said conductive metal oxide consists essentially of barium metaplumbate.

35. The bipolar electrode of claim 33, wherein said metal oxide consists essentially of a compound selected from the group consisting of $BaPbO_3$, $ZnSnO_3$, $CdSnO_3$, $ZnPbO_3$, $CdPbO_3$, $Cd_2PbO_4$, and $CdPb_2O_5$, and combinations thereof.

36. The bipolar electrode of claim 35, wherein said binder is olyethylene.

37. In a bipolar battery including a casing, a plurality of bipolar electrodes disposed in said casing each including a conductive substrate having a pair of layers of positive and negative active material disposed on opposite faces thereof, at least one separator interposed between said bipolar electrodes, and an electrolyte in which said electrodes and separator are in contact, the improvement wherein said substrate comprises:
particles of a conductive, sulfuric acid-resistant metal oxide which is substantially stable in aqueous sulfuric acid and consists essentially of a compound having the formula $A_aB_bO_c$, wherein A is Sr, Ba, Zn, Cd, or Ra, B is Zr, Sn, or Pb, $0.5 \leq a \leq 1$, $0.5 \leq b \leq 1$, and $2 \leq c \leq 3$; and
a sulfuric acid-resistant binder in which said conductive particles are dispersed.

38. The bipolar battery of claim 37, wherein said compound is barium metaplumbate.

39. A battery component for use in a lead-sulfuric acid battery in contact with a sulfuric acid electrolyte, wherein said component is coated with a thin layer of a conductive, sulfuric acid-resistant metal oxide of perovskite structure, wherein said metal oxide consists essentially of a compound selected from the group consisting of $BaPbO_3$, $ZnSnO_3$, $CdSnO_3$, $ZnPbO_3$, $CdPbO_3$, $Cd_2PbO_4$, and $CdPb_2O_5$, and combinations thereof.

40. The battery component of claim 39, wherein said component is a battery post.

41. The battery component of claim 39, wherein said component is an intercell connector.

42. The battery component of claim 39, wherein said component is a strap.

43. The battery component of claim 39, wherein said component is an end plate.

44. The battery component of claim 39, wherein said metal oxide layer is formed by deposition.

45. The battery component of claim 39, wherein said metal oxide layer is formed by applying a paint to said component, which paint comprises particles of said metal oxide in a binder.

46. The battery component of claim 39, wherein said compound is barium metaplumbate.

47. An electrode for use in the electrolytic synthesis of a product from a reactant in an aqueous sulfuric acid reaction medium, comprising a conductive, sulfuric acid-resistant metal oxide of perovskite structure, wherein said metal oxide consists essentially of a compound selected from the group consisting of $BaPbO_3$, $ZnSnO_3$, $CdSnO_3$, $ZnPbO_3$, $CdPbO_3$, $Cd_2PbO_4$, and $CdPb_2O_5$, and combinations thereof.

48. The electrode of claim 47, wherein said electrode comprises a conductive substrate and a coating of said metal oxide deposited on said substrate.

49. The electrode of claim 48, wherein said metal oxide is sintered to form said conductive substrate.

50. The electrode of claim 48, wherein said conductive substrate comprises said metal oxide embedded in an inert, plastic binder.

51. The electrode of claim 47, wherein said compound consists essentially of barium metaplumbate.

52. In an apparatus for the electrolytic synthesis of a product from a reactant in an aqueous sulfuric acid reaction medium, including a container for said medium, a pair of electrodes including an anode and a cathode disposable in said medium, and means for applying an electrical current to said medium through said electrodes to form said compound, the improvement wherein one of said electrodes contains a conductive, sulfuric acid-resistant metal oxide of perovskite structure which remains substantially unreactive during said electrolytic synthesis, wherein said metal oxide consists essentially of a compound selected from the group consisting of $BaPbO_3$, $ZnSnO_3$, $CdSnO_3$, $ZnPbO_3$, $CdPbO_3$, $Cd_2PbO_4$, and $CdPb_2O_5$, and combinations thereof.

53. The apparatus of claim 52, wherein said compound consists essentially of barium metaplumbate.

54. The apparatus of claim 53, wherein said one electrode comprises a conductive substrate and a coating of said metal oxide deposited on said substrate.

55. The apparatus of claim 54, wherein said metal oxide is sintered to form said conductive substrate.

56. The apparatus of claim 54, wherein said conductive substrate comprises said metal oxide embedded in an inert, plastic binder.

57. The apparatus of claim 52, wherein said one electrode is said anode, and said cathode comprises a material selected from lead, lead oxide, carbon, and a noble metal.

* * * * *

UNITED STATES PATENT AND TRADEMARK OFFICE
CERTIFICATE OF CORRECTION

PATENT NO. : 5,045,170

DATED : September 3, 1991

INVENTOR(S) : Norma K. Bullock and Wen-Hong Kao

It is certified that error appears in the above-identified patent and that said Letters Patent is hereby corrected as shown below:

Title page:
    and column 1, "ELECTRODIES" should be --ELECTRODES--.

Column 19, lines 4 and 5, "same or as greater" should be --same as or greater--.

Column 20, line 47, "olyethylene" should be --polyethylene--.

Signed and Sealed this

Ninth Day of November, 1993

Attest:

BRUCE LEHMAN

*Attesting Officer*      *Commissioner of Patents and Trademarks*